United States Patent
Gava

(10) Patent No.: US 7,805,570 B2
(45) Date of Patent: Sep. 28, 2010

(54) SYSTEM AND METHOD FOR SECURE DOCUMENT PROCESSING USING REMOVABLE DATA STORAGE

(75) Inventor: Fabio M. Gava, Ladera Ranch, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 453 days.

(21) Appl. No.: 11/851,979

(22) Filed: Sep. 7, 2007

(65) Prior Publication Data

US 2009/0070519 A1 Mar. 12, 2009

(51) Int. Cl.
*G06F 17/30* (2006.01)
(52) U.S. Cl. ....................................... 711/115
(58) Field of Classification Search ........................ None
See application file for complete search history.

(56) References Cited

U.S. PATENT DOCUMENTS

2006/0015756 A1* 1/2006 Chrisop et al. ............... 713/193
2008/0114990 A1* 5/2008 Hilbert et al. ............... 713/189

* cited by examiner

*Primary Examiner*—Tuan V Thai
*Assistant Examiner*—Duc T Doan
(74) *Attorney, Agent, or Firm*—SoCal IP Law Group LLP; Steven C. Sereboff; Jonathan Peace

(57) ABSTRACT

The subject application is directed to a system and method for secure document processing. A removable storage, such as a flash drive, magnetic storage, IC card, is installed in document processing device. A selected document processing operation, such as copying, scanning, and the like, is then performed. Data files resultant from the selected document processing operations are directed to the removable storage for being stored temporary, instead of being sent to the storage inherent to the document processing device. Data files temporary stored in the removable storage are then deleted.

12 Claims, 5 Drawing Sheets

SYSTEM AND METHOD FOR SECURE DOCUMENT PROCESSING USING REMOVABLE DATA STORAGE

BACKGROUND OF THE INVENTION

The subject application is directed generally to data security in shared document processing devices, and more particularly, to security associated with temporary or persistent data files associated with document processing operations on shared document processing devices.

Current office operations will typically share document processing devices to lessen expense, maintenance, space requirements, and power requirements. Typical document processing devices include functions such as scanning copying, printing, facsimile transmission, electronic mail transmission, or optical character recognition. Often times two or more document processing functions are contained in a device, referred to as a multifunction peripheral or MFP.

Typical document processing devices, such as MFPs, employ an intelligent controller, which includes at least one central processing unit and memory. Controller memory typically includes random access memory, as well as non-volatile storage, such as a hard disk, flash memory, or other suitable storage. Controllers direct operation of document processing operations, which operations typically result in generation of at least temporary files, that is files which are no longer needed once a document processing operation is completed, as well as persistent files, or files which include a result of a completed document processing operation. Examples of persistent files include image files, text files, word processing files, or the like.

In a shared document processing environment, there are times when a particular task includes sensitive information. A presence of such information on controller memory, or any other shared or commonly accessible memory, can compromise sensitivity. Such compromising can include direct access to stored files. Merely deleting sensitive information will not typically result in complete obliteration of data, allowing one to still retrieve certain stored information after deletion. Sensitive information may also be found by review of active or recently deleted temporary files created during a document processing operation.

While more secure erase techniques may assist in securing sensitive information on shared document processing devices, these operations are not foolproof. Additionally, document processing devices may be networked, or otherwise concurrently accessible leaving data open prior to deletion.

SUMMARY OF THE INVENTION

In accordance with one embodiment of the subject application, there is provided a system and method for secure data processing using removable data storage.

Further, in accordance with one embodiment of the subject application, there is provided a system and method for providing data security in shared document processing devices.

Still further, in accordance with one embodiment of the subject application, there is provided a system and method to provide security associated with temporary or persistent data files associated with document processing operations on shared document processing devices.

Further, in accordance with one embodiment of the subject application, there is provided a document processing system. The system comprises a controller having at least one processor and a controller storage including random access memory and non-volatile memory. The system also comprises means adapted for performing at least one document processing operation under direction of the controller, which at least one document processing operation includes generation of at least one of a temporary data file and a persistent data file. The system further comprises receiving means adapted for receiving a secondary non-volatile memory in data communication with the controller and detecting means adapted for detecting a presence of an associated secondary non-volatile memory with the receiving means. The system also includes means adapted for commencing at least one document processing operation after detection of a presence of the associated secondary non-volatile memory via the detecting means and means adapted for directing each data file resultant from the at least one document processing operation to the associated secondary non-volatile memory.

In one embodiment of the subject application, the at least one document processing operation is selected from a set comprising scanning, copying, printing, electronic mail transmission, optical character recognition, and facsimile transmission.

In another embodiment of the subject application, the secondary non-volatile memory is selected from a set comprising a flash drive, magnetic storage, IC card, and removable storage disk.

In a further embodiment of the subject application, the system further comprises means adapted for directing each data file to the controller storage upon a detected absence of a secondary non-volatile memory via the detecting means.

In yet another embodiment of the subject application, the system further comprises means adapted for selectively completing a non-secure erase of a data file on the secondary non-volatile memory.

Still further, in accordance with one embodiment of the subject application, there is provided a document processing method in accordance with the system as set forth above.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for secure data processing using removable data storage. In particular, the subject application is directed to a system and method for providing data security in shared document processing devices. More particularly, the subject application is directed to a system and method to provide security associated with temporary or persistent data files associated with document processing operations on shared document processing devices. It will become apparent to those skilled in the art that the system and method described herein are suitably adapted to a plurality of varying electronic fields employing secure file reproduction, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
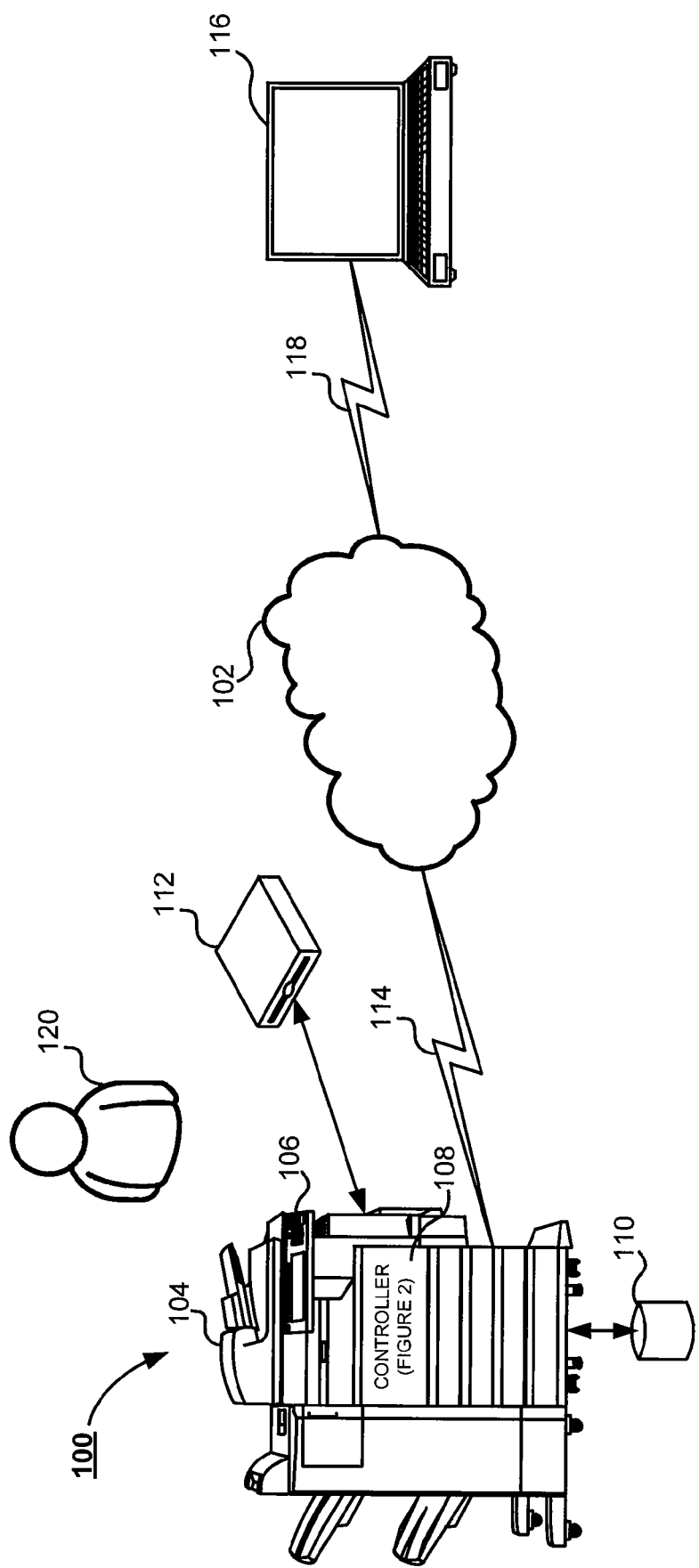
FIG. 1 is an overall diagram of a document processing system according to one embodiment of the subject application.

Referring now to FIG. 1, there is shown an overall diagram of a document processing system 100 in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a document processing device 104, depicted in FIG. 1 as a multifunction peripheral device, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing device 104 is suitably adapted to provide remote document processing services to external or network devices. Preferably, the document processing device 104 includes hardware, software, and any suitable combination thereof, configured to interact with an associated user, a networked device, or the like.

According to one embodiment of the subject application, the document processing device 104 is suitably equipped to receive a plurality of portable storage devices 112, including, without limitation, Firewire drive, USB drive, SD, MMC, XD, Compact Flash, Memory Stick, and the like. The portable storage device 112, as will be understood by those skilled in the art, includes any non-volatile memory, such as flash memory, magnetic storage, optical storage, and the like. Preferably, the document processing device 104 is capable of using such portable storage device 112 as temporary data storage, as will be appreciated by those skilled in the art. The functioning of the portable storage device 112 is explained in greater detail below.

In accordance with one particular embodiment of the subject application, the document processing device 104 further includes an associated user interface 106, such as a touchscreen, LCD display, touch-panel, alpha-numeric keypad, or the like, via which an associated user is able to interact directly with the document processing device 104. In accordance with the preferred embodiment of the subject application, the user interface 106 is advantageously used to communicate information to the associated user and receive selections from the associated user. The skilled artisan will appreciate that the user interface 106 comprises various components, suitably adapted to present data to the associated user, as are known in the art. In accordance with one embodiment of the subject application, the user interface 106 comprises a display, suitably adapted to display one or more graphical elements, text data, images, or the like, to an associated user, receive input from the associated user, and communicate the same to a backend component, such as a controller 108, as explained in greater detail below. Preferably, the document processing device 104 is communicatively coupled to the computer network 102 via a suitable communications link 114. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with one embodiment of the subject application, the document processing device 104 further incorporates a backend component, designated as the controller 108, suitably adapted to facilitate the operations of the document processing device 104, as will be understood by those skilled in the art. Preferably, the controller 108 is embodied as hardware, software, or any suitable combination thereof, configured to control the operations of the associated document processing device 104, facilitate the display of images via the user interface 106, direct the manipulation of electronic image data, and the like. For purposes of explanation, the controller 108 is used to refer to any myriad of components associated with the document processing device 104, including hardware, software, or combinations thereof, functioning to perform, cause to be performed, control, or otherwise direct the methodologies described hereinafter. It will be understood by those skilled in the art that the methodologies described with respect to the controller 108 are capable of being performed by any general purpose computing system, known in the art, and thus the controller 108 is representative of such a general computing device and is intended as such when used hereinafter. Furthermore, the use of the controller 108 hereinafter is for the example embodiment only, and other embodiments, which will be apparent to one skilled in the art, are capable of employing the system and method for secure data processing using removable data storage of the subject application. The functioning of the controller 108 will better be understood in conjunction with the block diagrams illustrated in FIGS. 2 and 3, explained in greater detail below.

Communicatively coupled to the document processing device 104 is a data storage device 110. In accordance with the preferred embodiment of the subject application, the data storage device 110 is any mass storage device known in the art including, for example and without limitation, magnetic storage drives, a hard disk drive, optical storage devices, flash memory devices, or any suitable combination thereof. In the preferred embodiment, the data storage device 110 is suitably adapted to store a document data, image data, electronic database data, or the like. It will be appreciated by those skilled in the art that while illustrated in FIG. 1 as being a separate component of the system 100, the data storage device 110 is capable of being implemented as internal storage component of the document processing device 104, a component of the controller 108, or the like, such as, for example and without limitation, an internal hard disk drive, or the like.

The system 100 illustrated in FIG. 1 further depicts a user device 116, in data communication with the computer network 102 via a communications link 118. It will be appreciated by those skilled in the art that the user device 116 is shown in FIG. 1 as a laptop computer for illustration purposes only. As will be understood by those skilled in the art, the user device 116 is representative of any personal computing device known in the art, including, for example and without limitation, a computer workstation, a personal computer, a personal data assistant, a web-enabled cellular telephone, a smart phone, a proprietary network device, or other web-enabled electronic device. The communications link 118 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the user device 116 is suitably adapted to generate and transmit electronic documents, document processing instructions, user interface modifications, upgrades, updates, personalization data, or the like, to the document processing device 104, or any other similar device coupled to the computer network 102.

Figure 2:
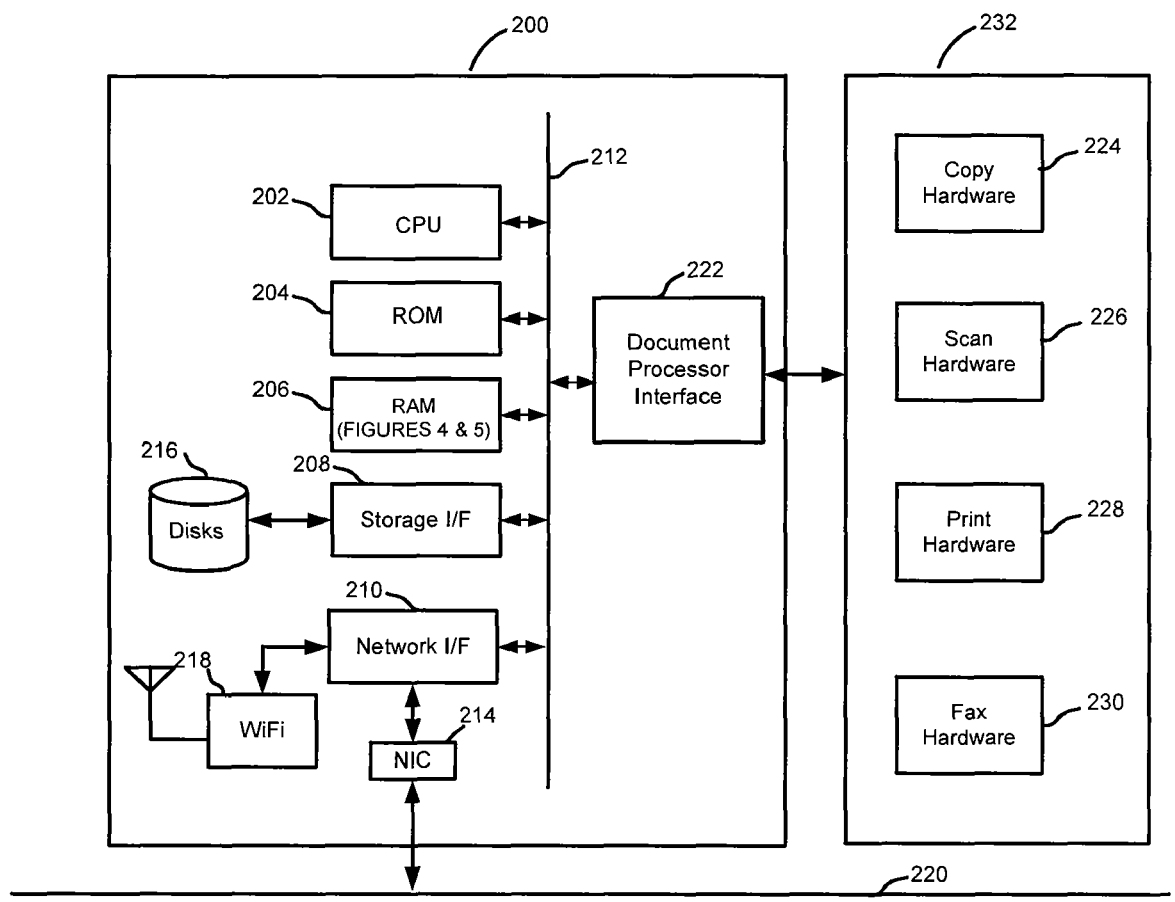
FIG. 2 is a block diagram illustrating controller hardware for use in the document processing system according to one embodiment of the subject application.

Turning now to FIG. 2, illustrated is a representative architecture of a suitable backend component, i.e., the controller 200, shown in FIG. 1 as the controller 108, on which operations of the subject system 100 are completed. The skilled artisan will understand that the controller 108 is representative of any general computing device, known in the art, capable of facilitating the methodologies described herein. Included is a processor 202, suitably comprised of a central processor unit. However, it will be appreciated that processor 202 is advantageously capable of being composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the controller 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and the network interface subsystem 210 is suitably accomplished via a bus data transfer mechanism, such as illustrated by bus 212.

Also in data communication with bus the 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that the controller 200 suitably operates any or all of the aforementioned document processing operations. Systems accomplishing more than one document processing operation are commonly referred to as multifunction peripherals or multifunction devices.

Figure 3:
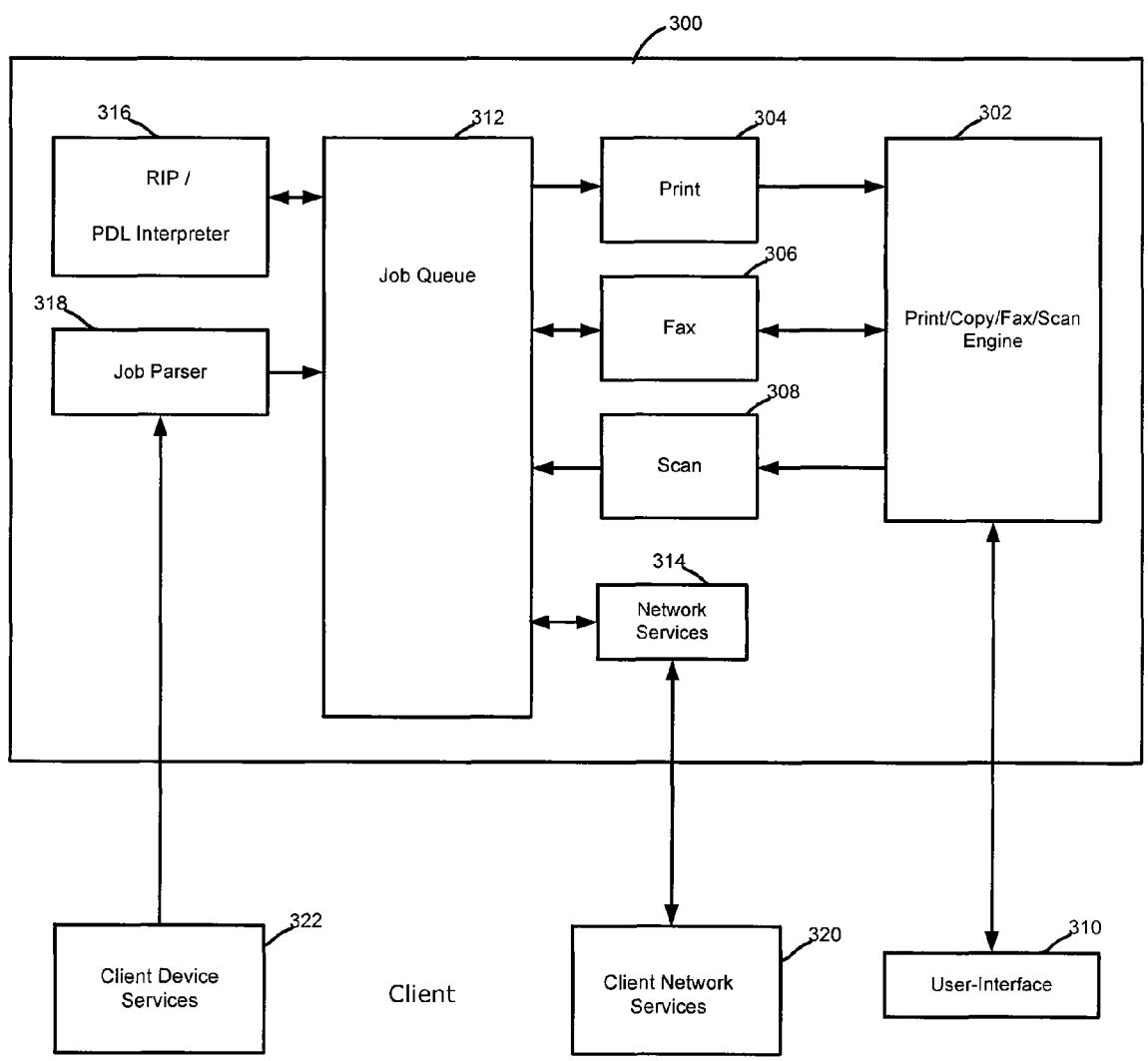
FIG. 3 is a functional diagram illustrating the controller for use in the document processing system according to one embodiment of the subject application.

Functionality of the subject system 100 is accomplished on a suitable document processing device, such as the document processing device 104, which includes the controller 200 of FIG. 2, (shown in FIG. 1 as the controller 108) as an intelligent subsystem associated with a document processing device. In the illustration of FIG. 3, controller function 300 in the preferred embodiment, includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 302 is suitably interfaced to a user interface panel 310, which panel allows for a user or administrator to access functionality controlled by the engine 302. Access is suitably enabled via an interface local to the controller, or remotely via a remote thin or thick client.

The engine 302 is in data communication with the print function 304, facsimile function 306, and scan function 308. These functions facilitate the actual operation of printing, facsimile transmission and reception, and document scanning for use in securing document images for copying or generating electronic versions.

A job queue 312 is suitably in data communication with the print function 304, facsimile function 306, and scan function 308. It will be appreciated that various image forms, such as bit map, page description language or vector format, and the like, are suitably relayed from the scan function 308 for subsequent handling via the job queue 312.

The job queue 312 is also in data communication with network services 314. In a preferred embodiment, job control, status data, or electronic document data is exchanged between the job queue 312 and the network services 314. Thus, suitable interface is provided for network based access to the controller function 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. The network services 314 also advantageously supplies data interchange with client side services 320 for communication via FTP, electronic mail, TELNET, or the like. Thus, the controller function 300 facilitates output or receipt of electronic document and user information via various network access mechanisms.

The job queue 312 is also advantageously placed in data communication with an image processor 316. The image processor 316 is suitably a raster image process, page description language interpreter or any suitable mechanism for interchange of an electronic document to a format better suited for interchange with device functions such as print 304, facsimile 306 or scan 308.

Finally, the job queue 312 is in data communication with a parser 318, which parser suitably functions to receive print job language files from an external device, such as client device services 322. The client device services 322 suitably include printing, facsimile transmission, or other suitable input of an electronic document for which handling by the controller function 300 is advantageous. The Parser 318 functions to interpret a received electronic document file and relay it to the job queue 312 for handling in connection with the afore-described functionality and components.

In operation, at least one document processing operation is performed under direction of an associated controller having at least one processor and controller storage including random access memory and non-volatile memory. The at least one document processing operation includes generation of at least one of a temporary data file and a persistent data file. Next, a secondary non-volatile memory in data communication with the associated controller is received, and the presence of the associated secondary non-volatile memory is detected. After detection of a presence of the associated secondary non-volatile memory, at least one document processing operation is commenced. Each data file resultant from the at least one document processing operation is then directed to the associated secondary non-volatile memory.

In accordance with one example embodiment of the subject application, an associated user 120 approaches the document processing device 104, as shown in FIG. 1, and selects, via the associated user interface 106, at least one document processing operation to be performed by the document processing device 104. It will be appreciated by those skilled in the art that the selection is also capable of being made from the user device 116 and communicated to the document processing device 104 via the communications link 118, the computer network 102, or the communications link 114. The document processing operation to be performed by the document processing device 104 is capable of being selected, for example and without limitation, from a set comprising scanning, copying, printing, electronic mail transmission, optical character recognition, and facsimile transmission.

Under direction of the controller 108, associated with the document processing device 104, the document processing device 104 performs the selected document processing operation. As described in detail above with respect to FIG. 2, the controller 108 has at least one processor 202 and controller storage including random access memory 206 and non-volatile memory 204. It will be appreciated by those skilled in the art that controller storage is illustrated in FIG. 1 as the data storage device 110. However, those skilled in the art will appreciate that the controller storage is capable of being implemented as, for example and without limitation, an internal hard disk drive, or the like. The selected document processing operation includes generation of at least one of a temporary data file and a persistent data file.

Next, an associated user 120 desiring to employ secure document processing provides data communication of a secondary non-volatile memory with the controller 108 associated with the document processing device 104. The secondary non-volatile memory is illustrated in FIG. 1 as a portable storage device 112. It will be apparent to a skilled artisan that the portable storage device 112 is capable of being employed, for example and without limitation, as a Firewire drive, USB drive, SD, MMC, XD, Compact Flash, Memory Stick, and the like. As will be further recognized by those skilled in the art, the secondary non-volatile memory is capable of being associated with the user device 116. In this embodiment, data communication between the secondary non-volatile memory and the controller 108 is provided via the communications link 118, the computer network 102, and the communications link 114.

Once the secondary non-volatile memory 112 is received, the controller 108 detects a presence of the associated secondary non-volatile memory 112. In accordance with one embodiment of the subject application, the receipt of the secondary non-volatile memory 112 in the form of flash-based memory corresponds to the physical insertion/connection of the memory 112 via an appropriate interface associated with the controller 108. Upon detection of a presence of the associated secondary non-volatile memory 112 by the controller 108, the document processing device 104 commences the at least one selected document processing operation. The controller 108 then directs each data file resultant from the at least one selected document processing operation to be stored on the associated secondary non-volatile memory 112. Thus, sensitive information is secured since it is not stored in the data storage device 110 associated with the document processing device 104, but is instead sent to the secondary non-volatile memory 112. In one embodiment, once the selected document processing operation is completed, the controller 108 selectively completes a non-secure erase of a data file on the secondary non-volatile memory 112. In the event the controller 108 detects absence of the secondary non-volatile memory 112, the controller 108 directs each data file to the controller storage illustrated in FIG. 1 as the data storage device 110. As will be evident to those skilled in the art, the data files when stored in the controller storage 110 are not capable of secure storage.

Figure 4:
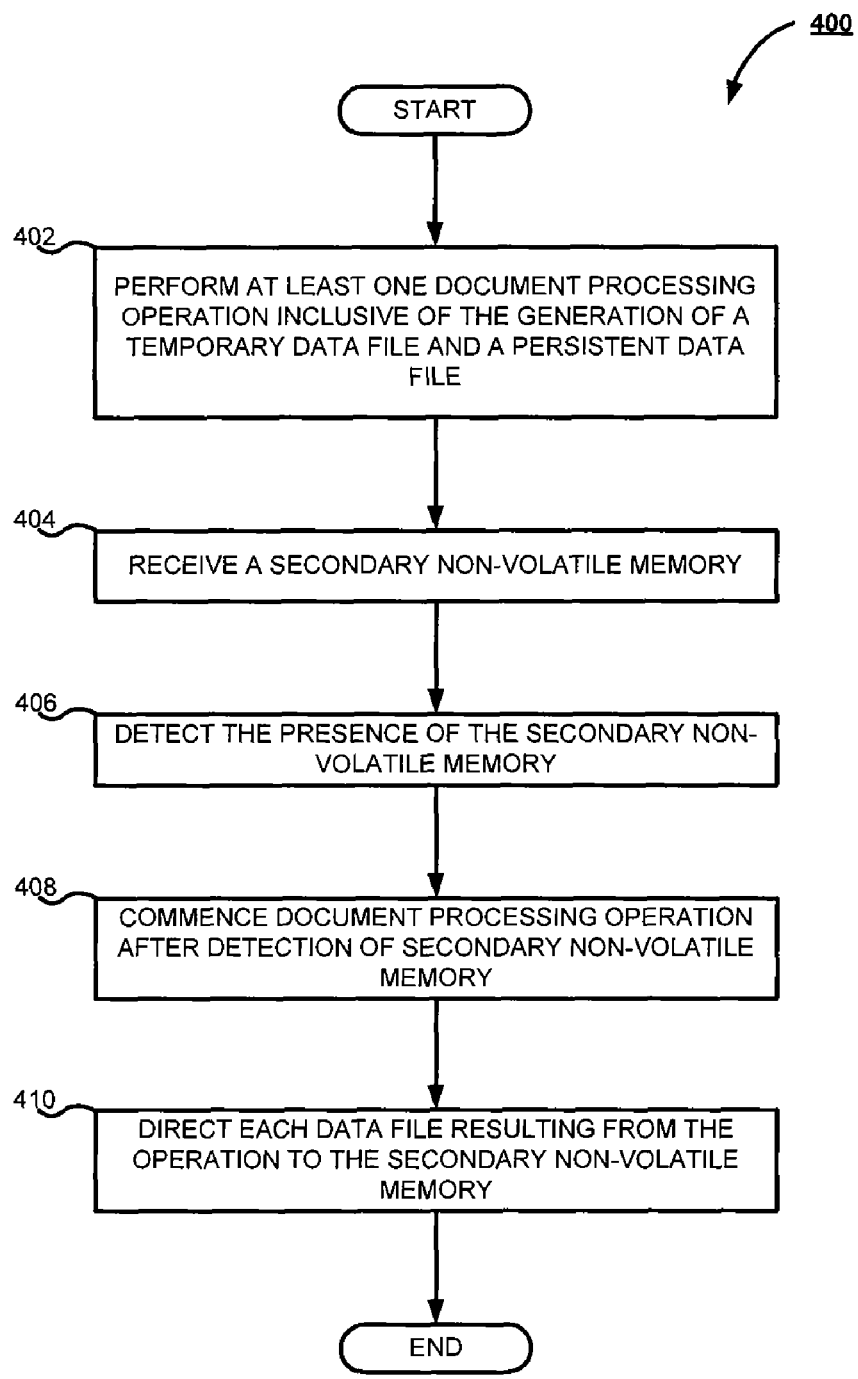
FIG. 4 is a flowchart illustrating a document processing method according to one embodiment of the subject application.

The skilled artisan will appreciate that the subject system 100 and components described above with respect to FIG. 1, FIG. 2, and FIG. 3 will be better understood in conjunction with the methodologies described hereinafter with respect to FIG. 4 and FIG. 5. Turning now to FIG. 4, there is shown a flowchart 400 illustrating a document processing method from the point-of-view of the document processing device 104 in accordance with one embodiment of the subject application. Beginning at step 402, the document processing device 104 performs at least one document processing operation under direction of the controller 108 associated with the document processing device 104. As described in detail above with reference to FIG. 2, the controller 108 has at least one processor 202 and controller storage including random access memory 206 and non-volatile memory 204. It will be appreciated by those skilled in the art that controller storage is illustrated in FIG. 1 as the data storage device 110. However, those skilled in the art will appreciate that the controller storage is capable of being implemented as, for example and without limitation, an internal hard disk drive, or the like. The at least one document processing operation includes generation of at least one of a temporary data file and a persistent data file.

At step 404 the secondary non-volatile memory 112 in data communication with the associated controller 108 is received. The controller 108 associated the document processing device 104 then detects, at step 406, the presence of the associated secondary non-volatile memory 112. The secondary non-volatile memory is illustrated in FIG. 1 as a portable storage device 112. It will be apparent to a skilled artisan that the portable storage device 112 is capable of being employed, for example and without limitation, as a Firewire drive, USB drive, SD, MMC, XD, Compact Flash, Memory Stick, and the like. As will be further recognized by those skilled in the art, the secondary non-volatile memory is capable of being associated with the user device 116. In this embodiment, data communication between the secondary non-volatile memory and the controller 108 is provided via the communications link 118, the computer network 102, or the communications link 114.

After detection, at step 406, of a presence of the associated secondary non-volatile memory 112, the document processing device 104, at step 408, commences the at least one document processing operation, which is capable of being previously selected by the associated user 120. Those skilled in the art will recognize that the document processing operation to be performed by the document processing device 104 is capable of being selected, for example and without limitation, from a set comprising scanning, copying, printing, electronic mail transmission, optical character recognition, and facsimile transmission. As mentioned above, the document processing operation is performed under direction of the controller 108 associated with the document processing device 104. Upon performing the document processing operation, the controller 108, at step 410, directs each data file resultant from the at least one document processing operation to be stored on the associated secondary non-volatile memory 112.

Figure 5:
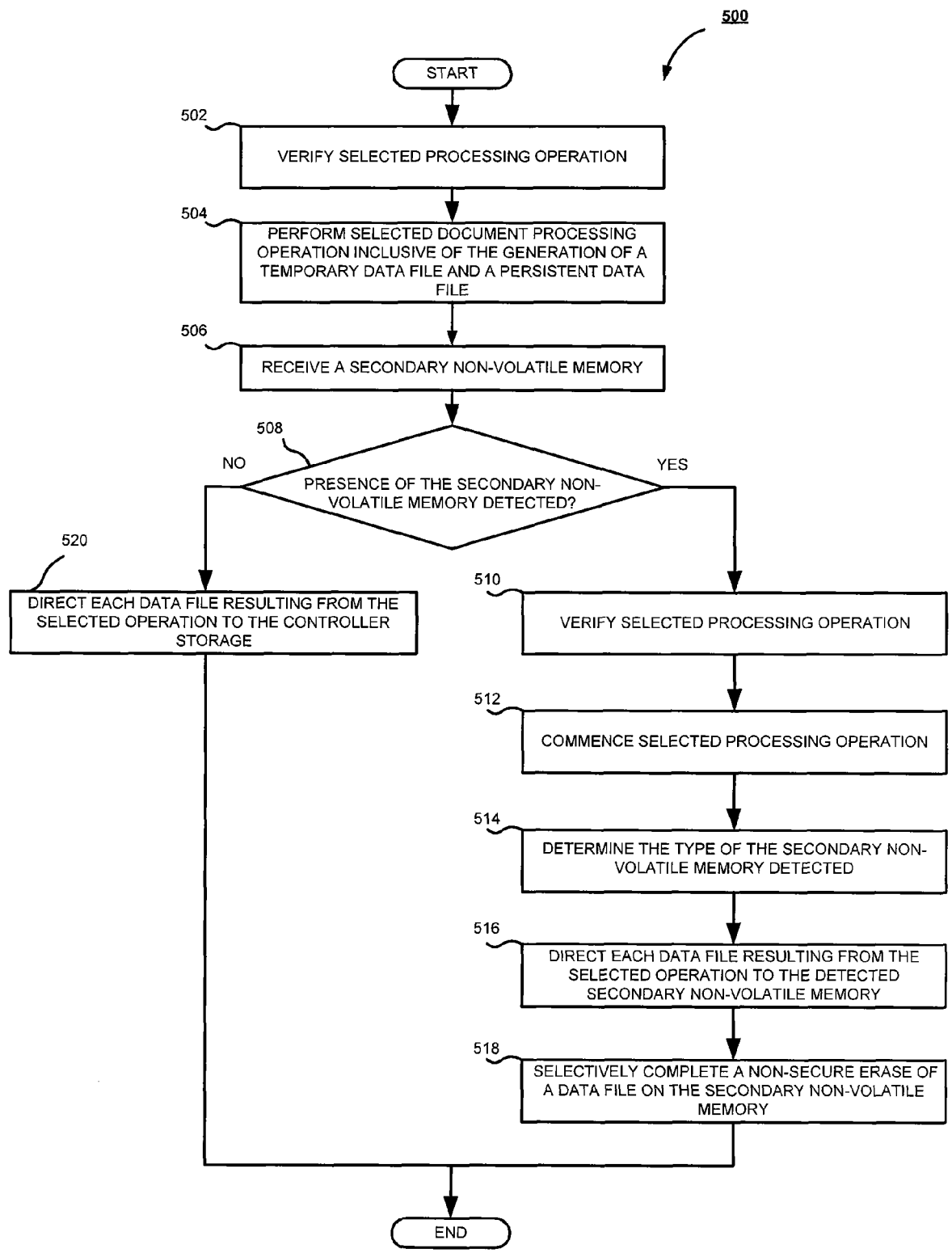
FIG. 5 is a flowchart illustrating a document processing method according to one embodiment of the subject application.

Turning now to FIG. 5, there is shown a flowchart 500 illustrating a document processing method from the point-of-view of the document processing device 104 in accordance with one embodiment of the subject application. Beginning at step 502, the controller 108 associated with the document processing device 104 verifies the document processing operation to be performed by the document processing device 104 according to the selection made by an associated user 120. As previously mentioned, the selection is capable of being made directly via the associated user interface 106. The selection is also capable of being made from the user device 116 and communicated to the document processing device 104 via the communications link 118, the computer network 102, and the communications link 114. The document processing operation to be performed by the document processing device 104 is capable of being selected, for example and without limitation, from a set comprising scanning, copying, printing, electronic mail transmission, optical character recognition, and facsimile transmission.

Once the selection is verified, the document processing device 104, at step 504, performs the selected document processing operation under direction of the associated controller 108. As described in detail above with reference to FIG. 2, the controller 108 has at least one processor 202 and controller storage including random access memory 206 and non-volatile memory 204. It will be appreciated by those skilled in the art that controller storage is illustrated in FIG. 1 as the data storage device 110. However, those skilled in the art will appreciate that the controller storage is capable of being implemented as, for example and without limitation, an internal hard disk drive, or the like. The at least one document processing operation includes generation of at least one of a temporary data file and a persistent data file.

At step 506, the secondary non-volatile memory 112 is received in data communication with the associated controller 108. The secondary non-volatile memory is illustrated in FIG. 1 as a portable storage device 112. It will be apparent to a skilled artisan that the portable storage device 112 is capable of being employed, for example and without limitation, as a Firewire drive, USB drive, SD, MMC, XD, Compact Flash, Memory Stick, and the like. As will be further recognized by those skilled in the art, the secondary non-volatile memory is capable of being associated with the user device 116. In this embodiment, data communication between the secondary non-volatile memory and the controller 108 is provided via the communications link 118, the computer network 102, and the communications link 114. The skilled artisan will appreciate that such data communications between the controller 108 and the secondary non-volatile memory is accomplished via secure data communication protocols, as will be known in the art. Thus, the secure communications channels ensure data privacy between the controller 108 and the secondary non-volatile memory.

A determination is then made at step 508, whether a presence of the associated secondary non-volatile memory 112 is detected. When such a determination is positive, flow proceeds to step 510, whereupon the controller 108 associated with the document processing device 104 verifies the processing operation selected by an associated user 120. As will be apparent to a skilled artisan, the document processing operation to be performed by the document processing device 104 is capable of being selected, for example and without limitation, from a set comprising scanning, copying, printing, electronic mail transmission, optical character recognition, and facsimile transmission. It will be further recognized by those skilled in the art, that the document processing operation selected by an associated user 120 at step 510 is capable of being the same as at selected at step 502, or differ from the one selected at step 502.

Once the selected document processing operation is verified, flow then proceeds to step 512, at which step the document processing device 104, commences the document processing operation selected by the associated user 120. At step 514, the type of the secondary non-volatile memory 112 is detected, such as, for example and without limitation, a flash drive, magnetic storage, IC card, removable storage disk, and the like. Next, upon performing the document processing operation, the controller 108, at step 516, directs each data file resultant from the selected document processing operation to the detected associated secondary non-volatile memory 112 for storage. Flow then proceeds to step 518, at which step the controller 108 associated with the document processing device 104 selectively completes a non-secure erase of a data file on the secondary non-volatile memory 112. Those skilled in the art will appreciate that upon completion of the selected document processing operation, the associated user 120 is capable of terminating the data communication between the controller 108 of the document processing device 104 and the secondary non-volatile memory 112 by removing the secondary non-volatile memory 112.

Returning now to step 508, upon a negative determination of a presence of the associated secondary non-volatile memory 112, flow proceeds to step 520. At step 520, each data file is directed to the controller storage illustrated in FIG. 1 as the data storage device 110. As will be evident to those skilled in the art, the data files when stored in the controller storage 110 are not capable of secure storage.

The subject application extends to computer programs in the form of source code, object code, code intermediate sources and partially compiled object code, or in any other form suitable for use in the implementation of the subject application. Computer programs are suitably standalone applications, software components, scripts or plug-ins to other applications. Computer programs embedding the subject application are advantageously embodied on a carrier, being any entity or device capable of carrying the computer program: for example, a storage medium such as ROM or RAM, optical recording media such as CD-ROM or magnetic recording media such as floppy discs; or any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the subject application principles as described, will fall within the scope of the subject application.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A document processing system comprising:
   a controller having at least one processor, and a controller storage including random access memory and non-volatile memory;
   means adapted for performing at least one document processing operation under direction of the controller, which at least one document processing operation includes generation of at least one of a temporary data file and a persistent data file;
   receiving means adapted for receiving a secondary non-volatile memory in data communication with the controller;
   determining means adapted for determining a presence of an associated secondary non-volatile memory with the receiving means;
   means adapted for commencing at least one document processing operation after the determination of a presence of the associated secondary non-volatile memory via the determining means;
   means adapted for selectively directing each data file resultant from the at least one document processing operation to a one of the controller storage and the associated secondary non-volatile memory, wherein a temporary non-secure data file resultant from the at least one document processing operation is stored in the controller storage in accordance with a determination of an absence of the secondary non-volatile memory and wherein the temporary non-secure data file resultant from the at least one document processing operation is directed to the secondary non-volatile memory in accordance with a determination of a present of the secondary non-volatile memory; and
   means adapted for deleting the temporary non-secure data file in the secondary non-volatile memory after completion of the at least one document processing operation.

2. The document processing system of claim 1 wherein the at least one document processing operation is selected from a set comprising scanning, copying, printing, electronic mail transmission, optical character recognition, and facsimile transmission.

3. The document processing system of claim 1 wherein the secondary non-volatile memory is selected from a set comprising a flash drive, magnetic storage, IC card, and removable storage disk.

4. A document processing method comprising the steps of:
   performing at least one document processing operation under direction of an associated controller having at least one processor and controller storage including random access memory and non-volatile memory, which at least one document processing operation includes generation of at least one of a temporary data file and a persistent data file;
   receiving a secondary non-volatile memory in data communication with the associated controller;
   determining a presence of the associated secondary non-volatile memory;
   commencing at least one document processing operation after a determination of a presence of the associated secondary non-volatile memory;
   selectively directing each data file resultant from the at least one document processing operation to a one of the controller storage and the associated secondary non-volatile memory wherein a temporary non-secure data file resultant from the at least one document processing operation is stored in the controller storage in accordance with a determination of an absence of the secondary non-volatile memory and wherein the temporary non-secure data file resultant from the at least one document processing operation is directed to the secondary non-volatile memory in accordance with a determination of a present of the secondary non-volatile memory; and
   deleting the temporary non-secure data file in the secondary non-volatile memory after completion of the at least one document processing operation.

5. The document processing method of claim 4 wherein the at least one document processing operation is selected from a set comprising scanning, copying, printing, electronic mail transmission, optical character recognition, and facsimile transmission.

6. The document processing method of claim 4 wherein the secondary non-volatile memory is selected from a set comprising a flash drive, magnetic storage, IC card, and removable storage disk.

7. A computer-implemented document processing method comprising the steps of:
performing at least one document processing operation under direction of an associated controller having at least one processor and controller storage including random access memory and non-volatile memory, which at least one document processing operation includes generation of at least one of a temporary data file and a persistent data file;
receiving a secondary non-volatile memory in data communication with the associated controller;
determining a presence of the associated secondary non-volatile memory;
commencing at least one document processing operation after a determination of a presence of the associated secondary non-volatile memory;
selectively directing each data file resultant from the at least one document processing operation to a one of the controller storage and the associated secondary non-volatile memory, wherein a temporary non-secure data file resultant from the at least one document processing operation is stored in the controller storage in accordance with a determination of an absence of the secondary non-volatile memory and wherein the temporary non-secure data file resultant from the at least one document processing operation is directed to the secondary non-volatile memory in accordance with a determination of a present of the secondary non-volatile memory; and
deleting the temporary non-secure data file in the secondary non-volatile memory after completion of the at least one document processing operation.

8. The computer-implemented document processing method of claim 7 wherein the at least one document processing operation is selected from a set comprising scanning, copying, printing, electronic mail transmission, optical character recognition, and facsimile transmission.

9. The computer-implemented document processing method of claim 7 wherein the secondary non-volatile memory is selected from a set comprising a flash drive, magnetic storage, IC card, and removable storage disk.

10. A document processing system comprising:
a controller having at least one processor, and a controller storage including random access memory and non-volatile memory;
the processor operable for performing at least one document processing operation under direction of the controller, which at least one document processing operation includes generation of at least one of a temporary data file and a persistent data file;
a data connection operable for receiving a secondary non-volatile memory in data communication with the controller;
the processor further operable for determining a presence of an associated secondary non-volatile memory;
the processor further operable for commencing at least one document processing operation after the determination of a presence of the associated secondary non-volatile memory;
the processor further operable for selectively directing each data file resultant from the at least one document processing operation to a one of the controller storage and the associated secondary non-volatile memory, wherein a temporary non-secure data file resultant from the at least one document processing operation is stored in the controller storage in accordance with a determination of an absence of the secondary non-volatile memory and wherein the temporary non-secure data file resultant from the at least one document processing operation is directed to the secondary non-volatile memory in accordance with a determination of a present of the secondary non-volatile memory; and
the processor further operable for deleting the temporary non-secure data file in the non-volatile memory after completion of the at least one document processing operation.

11. The document processing system of claim 10 wherein the at least one document processing operation is selected from a set comprising scanning, copying, printing, electronic mail transmission, optical character recognition, and facsimile transmission.

12. The document processing system of claim 10 wherein the secondary non-volatile memory is selected from a set comprising a flash drive, magnetic storage, IC card, and removable storage disk.

* * * * *